April 9, 1963 A. J. RADIN 3,084,596
OPTICAL REFLECTING DEVICE
Filed Sept. 15, 1959 2 Sheets-Sheet 1

*INVENTOR.*
ALEXANDER J. RADIN
BY
*ATTORNEY*

April 9, 1963 A. J. RADIN 3,084,596
OPTICAL REFLECTING DEVICE
Filed Sept. 15, 1959 2 Sheets-Sheet 2
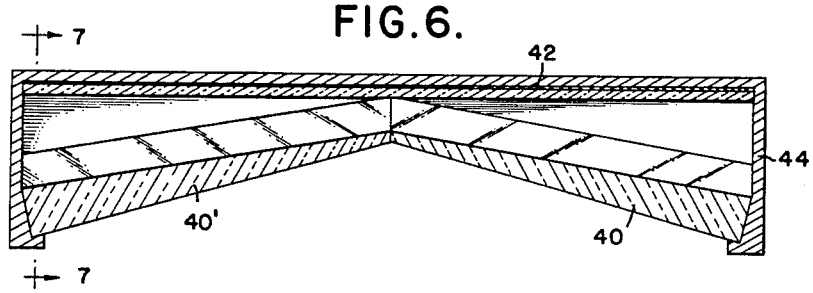
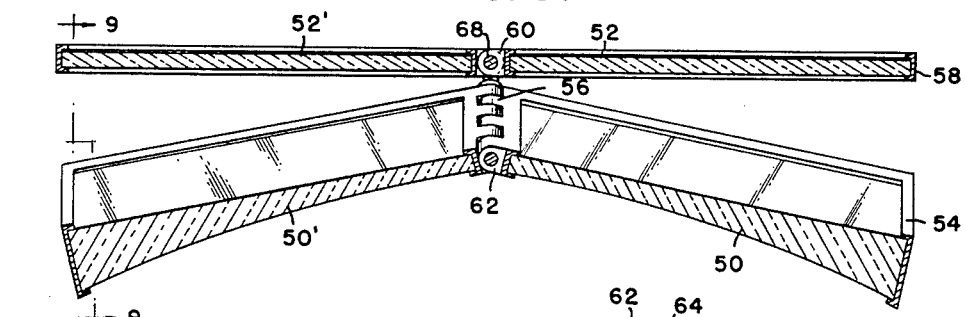
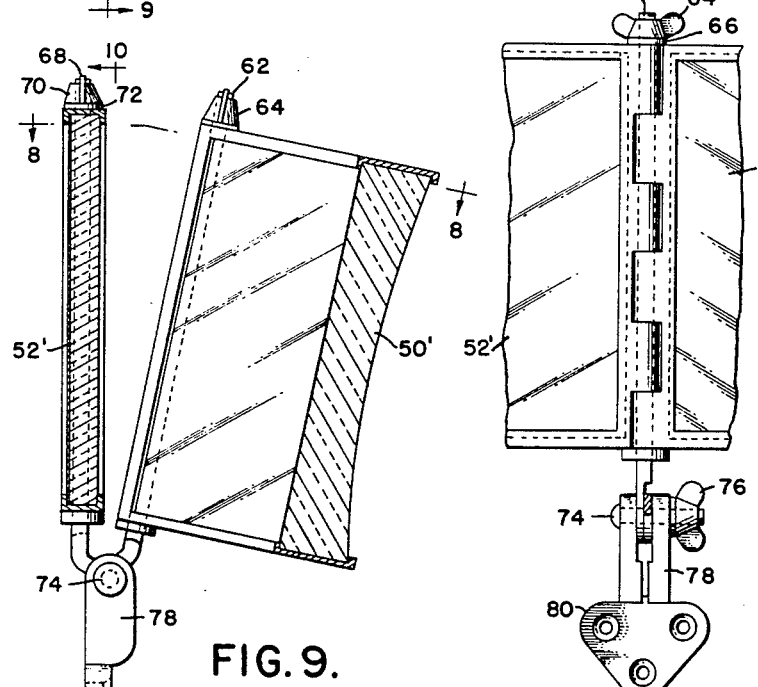
FIG. 10.
FIG. 9.
INVENTOR.
ALEXANDER J. RADIN
BY
ATTORNEY United States Patent Office 3,084,596
Patented Apr. 9, 1963

3,084,596
OPTICAL REFLECTING DEVICE
Alexander J. Radin, 5 Nevins St., Brooklyn 17, N.Y.
Filed Sept. 15, 1959, Ser. No. 840,166
9 Claims. (Cl. 88—74)

This invention relates to an optical device which refracts rays incident on and reflected by a reflecting surface. Refraction of these rays causes changes in their direction and alters the apparent position or dimensions of images reflected by said surface. If, for example, a prism or lens is placed in the paths of rays from a field reflected by a mirror, the rays will be twice refracted and the images in the field will change position or size as a result of refraction by the prism or lens.

While this association of reflecting surface and refracting element is useful in devices of various types, the partial reflections from the faces of the refracting element may be confusing due to the occurrence of spurious or ghost images in the field of images reflected by the reflecting surface. Especially if the images are of different intensities or are much brighter than the background, it may be difficult to distinguish between the images reflected from the different surfaces.

I overcome this difficulty by arranging the refracting element at such an angle to the reflecting surface that all reflections from said element produced by rays transmitted to and from the reflecting surface will be directed away from the paths of rays reflected by the reflecting surface. With this association of reflecting surface and refracting element, the rays are twice refracted and the reflected images appear without conflicting spurious or "ghost" images.

The principal object of this invention is to associate a refracting element with a reflecting surface so that the directions of certain rays to and from said surface are altered by said refracting element but reflections of said rays from said refracting element are directed out of the paths of rays from said surface so as to avoid conflicting spurious images.

Another object is to associate a prism or lens with a reflecting surface so that the directions of rays to and from said surface are altered by said prism or lens and reflections of said rays from said prism or lens will not conflict with reflections from said reflecting surface.

This application is a continuation-in-part of Ser. No. 578,248, filed April 16, 1956, now abandoned.

FIG. 6 is a longitudinal section on line 6—6 of FIG. 7 through a modified form of the invention.

FIG. 8 is a longitudinal section on line 8—8 of FIG. 9 through another modified form.

FIG. 9 is a cross section on line 9—9 of FIG. 8.

FIG. 10 is a section on line 10—10 of FIG. 9 showing a fragmentary front elevation of a portion of FIG. 8.

Figure 1:
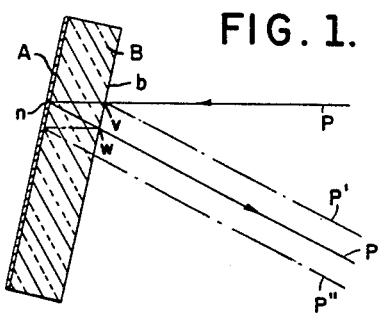
FIG. 1 is a transverse section of a mirror in contact with a face of a prism.

The problem of multiple reflections from faces of a refracting element is demonstrated by the diagram in FIG. 1, in which a reflecting surface or mirror A has the refracting element or prism B in contact. The ray P is reflected from the reflecting surface at $n$. The face $b$ of the prism also partially reflects the ray P at $v$ and $w$ to produce reflections P′ and P″. These last reflections will produce spurious images and if several direct rays and several spurious images are present, it is obvious that the images reflected by the mirror A will be confused by the various images reflected by the face $b$.

Figure 2:
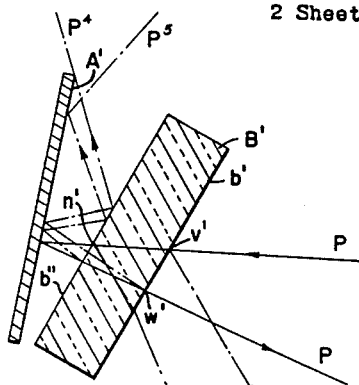
FIG. 2 is a transverse section of mirror and prism illustrating the principles of my invention, with the adjacent faces of the prism at angles to the surface of the mirror.

As illustrating the principle of my invention, a mirror A′ and prism B′ are shown in section in FIG. 2, with the faces of the prism at angles to the mirror. The ray P will be reflected by the mirror A′. The refraction in the plane of the section is slight and since the rays will be parallel, does not affect the principle. The rays reflected by faces $b'$, $b''$ of the prism at $n'$, $v'$, $w'$, however, are directed away from the path of the ray P, so that no images produced by the reflected rays $P^2$, $P^3$, $P^4$, $P^5$ will conflict with the images along the path of ray P.

Figure 3:
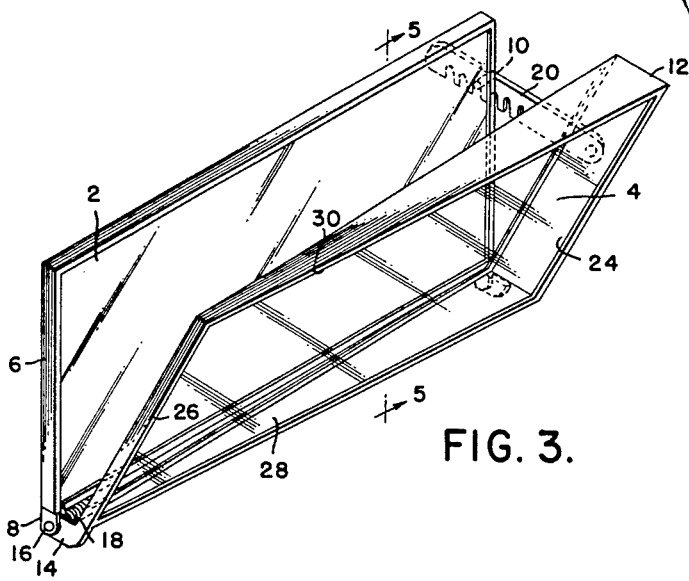
FIG. 3 is a perspective view of a reflecting device embodying my invention.
Figure 4:
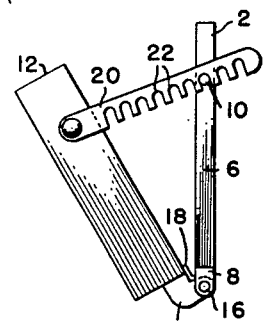
FIG. 4 is an end elevation of the right-hand end of FIG. 3.
Figure 5:
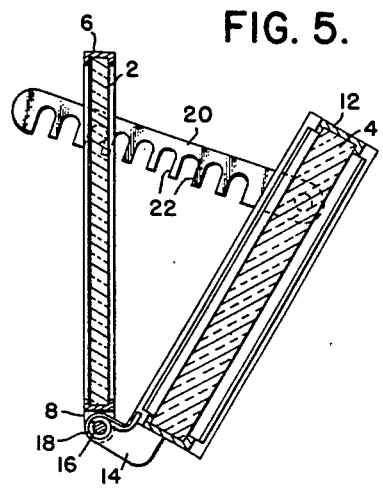
FIG. 5 is a transverse section on line 5—5 of FIG. 3.

As an embodiment of this principle, a reflecting device is shown in FIGS. 3, 4 and 5 consisting of a mirror 2 and prism 4. The mirror is mounted in a frame 6 having lugs 8 at its lower corners, and a pin 10 projecting from one end. Prism 4 is mounted in a frame 12, which has lugs 14 at its lower corners and a latch 20 pivoted on one end opposite the pin 10. A rod 16 passes through the lugs 8 and 14 of the mirror and prism frames to connect these elements for pivotal movement and a spring 18 tends to separate these elements. Latch 20 with notches 22 to engage pin 10 maintains these elements at a selected angle.

As may be seen in FIG. 3, the prism is thicker at its end 24 than at the opposite end 26, while edges 28, 30 extend between these ends. As the prism decreases in thickness from end 24 towards end 26, the distance between the faces varies, and is a function of position, or of the distance from one of the ends. With the prism decreasing in thickness toward the left, as viewed in FIG. 3, refraction produced by the prism will shift the visible field to the right, so that the field viewed in the mirror will be to the right of that viewed in the mirror without the prism.

When the device shown in FIG. 3 is mounted on a vehicle, the viewer merely releases latch 20 and pivots the prism 4 away from the mirror until no reflections from the faces of the prism are visible, and only the reflections from the mirror can be seen. The adjustment provides for positioning the prism for viewing from different positions. When properly arranged, as will be evident from the diagram in FIG. 2, the field of view will be completely free of spurious images reflected by the prism.

Figure 7:
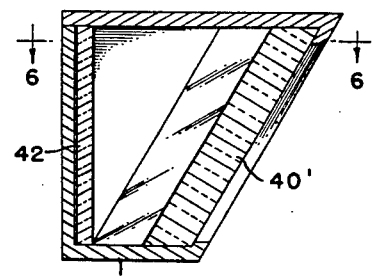
FIG. 7 is a cross-section on line 7—7 of FIG. 6.

The embodiment illustrated in FIGS. 6 and 7 shows the use of two prisms 40, 40′ in a rear view device to enable the viewer to observe the field in the rear both to the right and to the left of that normally visible in the mirror. In this form, the prisms 40, 40′ and mirror 42 are mounted in a casing 44 at a fixed angle relative to each other. This angle may be selected so that no spurious images are visible at any position in which reflected images are normally viewed.

In FIG. 8 is shown an embodiment of the invention consisting of two prisms 50, 50′ similar to those in FIG. 6 but pivoted together and also mounted for angular adjustment on a support. The mirror also is in two parts 52, 52′ pivotally connected and adjustably mounted.

The two prisms 50, 50′ are mounted in frames 54, these frames 54 having complementary hinges 56 through which extends pintle 62. A wing nut 64 and spring washer 66 serve to clamp the two frames to maintain the relative position of the two prisms.

Similarly the mirrors 52, 52′ are mounted in frames 58 hinged together at 60, a pintle 68 passing through the hinges and a wing nut 70 and spring washer 72 serving to clamp the mirror frames. The two pintles are rabbeted at their adjacent ends and mounted on a bolt 74 in the bifurcated portion 78 of a bracket 80. The bolt 74 has a wing nut 76 by which the ends of the pintles are clamped in the bracket. With this connection, the vertical angles of both the mirrors and the prisms may be adjusted.

In this form of the invention, each of the refracting elements or prisms 50, 50' has one face concavely curved, so that it forms a lens to change the apparent dimensions of the image. As shown the concave curvature reduces the size of images, or enlarges the field visible in the mirror. In addition, the prism 50 or 50' also shifts the visible field according to the position to which the prism is adjusted. Thus the prisms may be adjusted to view different portions of the field, and also may be adjusted about a horizontal axis to avoid spurious images. The mirrors also may be adjusted either horizontally or vertically to select the field of view.

These embodiments of the invention used as illustrations herein show how a refracting element having either plane or curved faces may be combined with a reflecting surface so that the directions of rays to and from the reflecting surface are altered by the refracting member, and all reflections of said rays from the faces of the refracting member are directed out of the field of reflections from the reflective surface. In this manner, full advantage may be taken of the refraction of reflected rays without the confusion and annoyance of spurious "ghost" images.

In addition to altering the rays transmitted to and from the mirror, the prism or lens may also appreciably reduce the glare of such rays from the bright images reflected in the mirror. Most of the glare arising from surface reflections will be reflected by a face of the prism, and as these reflections do not appear in the field of reflections from the mirror, much of the glare in this field will be eliminated. The degree of reflection of the glare rays may be determined by the transmissibility of the material of the prism or lens.

Various embodiments of the invention may be devised without departing from the essential characteristics of the invention, which are defined in the claims below.

What is claimed is:

1. In an optical device for reflecting rays from images in a limited field and for refraction of said rays, the combination of a reflecting element having a reflecting surface, and a transparent refracting element positioned to transmit said rays directed to and reflected by said reflecting surface, said refracting element having faces which are traversed by said rays and which partially reflect said rays from said field on entering and on emerging from said element, said refracting element varying in thickness between said faces so that the rays from said images reflected by said reflecting surface are altered by refraction on transmission of said rays through said refracting element both to and from said reflecting surface and certain of said rays traveling toward said reflecting surface are partially reflected on entering said element in the same direction as certain of said rays traveling toward said reflecting surface are reflected on emerging from said body, said refracting element being positioned with its faces so angularly related to said reflecting surface that said rays from images in said field reflected by its said faces are deviated from the path of the rays reflected by said reflecting surface, whereby the spurious images formed by reflections from said faces of said refracting element will be spaced from the field of images reflected by said reflecting surface, said refracting member being angularly adjustable to vary the angular relation of said faces of said refracting member with respect to said reflecting surface, so that the angle between the paths of the rays reflected from said faces of said refracting member and the path of the rays from said reflecting surface may be altered to vary the spacing of the spurious images from the field of images reflected by said reflecting surface.

2. In an optical device, the combination of a light reflecting member having a totally reflecting surface, and a transparent, light refracting member having diametrically opposite sides and opposite faces intermediate said sides, one of said faces having opposite edges extending between said sides, said refracting member being mounted adjacent said reflecting surface with said one of said faces confronting said surface and with one of said edges spaced a greater mean distance from said surface than the other edge, and being so positioned that light from a limited field directed toward and reflected back from said surface passes through said faces and is refracted by said refracting member, and that light reflected from the faces is directed beyond the field of said light reflected from said surface, the distance between said faces varying so that the direction of transmitted rays is altered due to variations in thickness, whereby the refracting member will refract the light transmitted to alter the direction of the rays of the image reflected by said reflecting surface, while no images caused by reflections from said faces of the refracting member will be visible in the field of light reflected from the reflecting surface.

3. The combination as in claim 2, in which the distance between said faces decreases from a maximum value at one side to a minimum value at the opposite side.

4. The combination as in claim 2, in which the distance between said faces is at a maximum value at one side.

5. The combination as in claim 2, in which said refracting member is angularly adjustable to alter the distance of said one of said edges from said surface.

6. In an optical device, the combination of a mirror having a reflecting surface in which images of objects may be viewed, and a transparent prism having two opposite faces positioned with one of said faces confronting said reflecting surface to refract light passing from said objects through said faces to said mirror and reflected back by said surface through said faces to an observer, said prism decreasing in thickness horizontally and mounted with the upper and lower edges of said confronting face spaced different mean distances from said reflecting surface so that said confronting face is at such an angle to said surface that reflections of said light from the faces of said prism are directed away from the reflections from said mirror and spurious images caused by reflections of said light from the prism are not visible in proximity to the image reflected by said mirror.

7. In an optical device, the combination of a mirror having a reflecting surface in which images of objects may be viewed, and a transparent prism having two opposite faces positioned with one of said faces confronting said reflecting surface to refract light passing from said objects through said faces to said mirror and reflected back by said surface through said faces to an observer, said prism decreasing in thickness horizontally and mounted for angular movement relative to said mirror about a horizontally extending axis so that the said prism may be adjusted with one of the upper and lower edges of said confronting face spaced a different mean distance from said reflecting surface than is the other edge and the said confronting face is at such an angle to said surface that reflections of said light from the faces of said prism are directed away from the field of view of the mirror, without substantial change in the refraction of the images viewed in the mirror and without the appearance of spurious images in said field.

8. In an optical device, the combination of reflecting means having a reflecting surface, and refracting means positioned to transmit rays to and from said reflecting means, said refracting means comprising two prisms having their edges of minimum thickness contiguous and their opposite ends of maximum thickness, said ends of maximum thickness being spaced farther from said reflecting means than said contiguous ends to provide a view laterally of the mirror, and the contiguous ends being angularly related to the reflecting means so that reflections of said rays from the faces extending between the contiguous ends and the opposite ends will be separated from the field of reflections from the reflecting surface.

9. In an optical device, the combination of a pair of mirrors hingedly connected along adjacent edges, and a pair of refracting elements hingedly connected along adjacent edges, the axis of said two hinges lying in the same plane, said hinge connection of said pair of refracting elements being pivotally connected to said mirors adjacent one end for movement about an axis perpendicular to the plane of said axes, said refracting members being positionable to transmit and refract rays to and from said mirrors so as to alter the direction of transmitted rays, and being adjustable to direct reflection from the faces of said refracting elements out of the field of reflections from said mirrors.

References Cited in the file of this patent

UNITED STATES PATENTS

| | | |
|---|---|---|
| 957,502 | Dupuis | May 10, 1910 |
| 1,834,017 | Carbonara | Dec. 1, 1931 |
| 1,869,456 | Bausch | Aug. 2, 1932 |
| 2,312,888 | Everest | Mar. 2, 1943 |
| 2,338,488 | Brown | Jan. 4, 1944 |
| 2,455,818 | Sherts | Dec. 7, 1948 |
| 2,471,524 | Hendricks | May 31, 1949 |
| 2,631,498 | Barkley | Mar. 17, 1953 |
| 2,705,434 | Hansen | Apr. 5, 1955 |

FOREIGN PATENTS

| | | |
|---|---|---|
| 558,481 | Great Britain | Jan. 6, 1944 |
| 526,078 | Italy | May 13, 1955 |